US010821628B2

(12) United States Patent
Toncelli

(10) Patent No.: US 10,821,628 B2
(45) Date of Patent: Nov. 3, 2020

(54) APPARATUS AND METHOD FOR VACUUM VIBRO-COMPRESSION OF MIXES

(71) Applicant: Luca Toncelli, Bassano del Grappa (IT)

(72) Inventor: Luca Toncelli, Bassano del Grappa (IT)

(*) Notice: Subject to any disclaimer, the term of this patent is extended or adjusted under 35 U.S.C. 154(b) by 499 days.

(21) Appl. No.: 15/322,858

(22) PCT Filed: Jul. 7, 2015

(86) PCT No.: PCT/IB2015/055130
§ 371 (c)(1),
(2) Date: Dec. 29, 2016

(87) PCT Pub. No.: WO2016/005900
PCT Pub. Date: Jan. 14, 2016

(65) Prior Publication Data
US 2017/0297222 A1 Oct. 19, 2017

(30) Foreign Application Priority Data

Jul. 8, 2014 (IT) .............................. TV2014A0100

(51) Int. Cl.
*B29C 43/56* (2006.01)
*B28B 3/02* (2006.01)
(Continued)

(52) U.S. Cl.
CPC .............. *B28B 3/022* (2013.01); *B28B 1/082* (2013.01); *B29C 43/56* (2013.01); *B29C 67/244* (2013.01);
(Continued)

(58) Field of Classification Search
CPC ....... B28B 3/022; B28B 1/082; B29C 67/244; B29C 43/56; B29C 2043/561; B29C 2791/008
See application file for complete search history.

(56) References Cited

U.S. PATENT DOCUMENTS 4,689,105 A * 8/1987 Fazlin ..................... B29C 43/56
156/285
4,698,010 A * 10/1987 Toncelli ................. B28B 3/022
186/61
(Continued)

FOREIGN PATENT DOCUMENTS

CN 85105664 A 1/1987
DE 4320860 A1 1/1994
(Continued)

OTHER PUBLICATIONS

English Abstract for Italian Publication No. 1259130 B, published Mar. 11, 2013, 2 pgs.
(Continued)

*Primary Examiner* — Atul P. Khare
(74) *Attorney, Agent, or Firm* — Fredrikson & Byron, P.A.

(57) ABSTRACT

An apparatus for vacuum vibro-compression of mixes arranged on a support comprises a press (12) provided with a press ram (18) having vibratory devices (22), and a pressing surface (16). The press (12) comprises a vacuum bell (24). The apparatus is characterized in that it comprises an entry chamber (44) in the region of the inlet opening (36) of the bell (24) having a first opening (48) which can be controllably closed and opened with a first gate (50) adapted to prevent fluid communication between the outside and inside of the entry chamber (44) and a second gate (52) able to be controllably opened and closed, in the region of the inlet opening (36) of the bell (24), and adapted to prevent fluid communication between entry chamber (36) and the inside of the bell (24) or to allow the passage of the support with the mix from the entry chamber (36) to the inside of the bell (24). The apparatus also comprises an exit chamber (46)
(Continued)

in the region of the outlet opening (38), having a third gate (54) provided in the region of the outlet opening (38), able to be controllably closed and opened and adapted to prevent fluid communication between the inside of the bell (24) and the inside of the exit chamber (46) or to allow the passage of the support with the compacted slab from inside the bell (24) to the exit chamber (46), and a second opening (56) which can be controllably closed and opened with a fourth gate (58) which is adapted to prevent fluid communication between the inside of the exit chamber and the outside. A method for vacuum vibro-compression of mixes contained inside a mould, comprising the steps of: inserting a support with the mix inside the entry chamber (44) and closing the first gate (50); generating a given vacuum value inside the entry chamber (44) with the first gate (50) and the second gate (52) closed; opening the second gate (52) and inserting the support inside the bell (24) where a given vacuum value is already present; closing the second gate (52) and performing vacuum vibro-compression of the mix with the second and third gates (52, 54) closed; once vibro-compression has been completed, opening the third gate (52) and transferring the support into the exit chamber (46) where a given vacuum value is already present; closing the third gate (54), restoring the atmospheric pressure inside the exit chamber (46); opening the fourth gate (58) and discharging the support.

5 Claims, 8 Drawing Sheets

(51) Int. Cl.
*B28B 1/08* (2006.01)
*B29C 67/24* (2006.01)
*B28B 7/44* (2006.01)

(52) U.S. Cl.
CPC .. *B29C 2043/561* (2013.01); *B29C 2791/008* (2013.01)

(56) References Cited

U.S. PATENT DOCUMENTS

| | | | |
|---|---|---|---|
| 6,284,173 B1 | 9/2001 | Austin et al. | |
| 6,355,191 B1 * | 3/2002 | Toncelli | B28B 7/44 |
| | | | 264/40.4 |
| 7,753,253 B2 * | 7/2010 | Terada | H01L 21/563 |
| | | | 118/683 |
| 9,085,090 B2 * | 7/2015 | Toncelli | B06B 1/16 |
| 2013/0136819 A1 * | 5/2013 | Toncelli | B06B 1/16 |
| | | | 425/432 |

FOREIGN PATENT DOCUMENTS

| | | | | |
|---|---|---|---|---|
| DE | 19640281 A1 * | 4/1997 | | B28B 3/022 |
| GB | 2164289 A | 3/1986 | | |
| IT | PD920131 A1 | 1/1994 | | |
| IT | 1242778 B | 5/1994 | | |
| JP | 04272804 A * | 9/1992 | | B28B 3/022 |
| WO | WO-2006122892 A1 * | 11/2006 | | B28B 7/44 |
| WO | 2012017401 A1 | 2/2012 | | |

OTHER PUBLICATIONS

English Abstract for Italian Publication No. 1401385 B1, published Jul. 18, 2013. 2 pgs.

English Abstract for Italian Publication No. TV201000118 A1B, published Feb. 7, 2012, 2 pgs.

PCT International Search Report and Written Opinion for Intl. App. No. PCT/IB2015/055130, from which the instant application is based, 9 pgs.

\* cited by examiner

APPARATUS AND METHOD FOR VACUUM VIBRO-COMPRESSION OF MIXES

RELATED APPLICATIONS

This application is a 35 U.S.C. 371 national stage filing from International Application No. PCT/IB2015/055130, filed Jul. 7, 2015, which claims priority to Italian Application No. TV2014A000100, filed Jul. 8, 2014, the teachings of which are incorporated herein by reference.

The present invention relates to an apparatus and a method for vacuum vibro-compression of mixes.

In particular, the present invention relates to an apparatus for the vacuum vibro-compression of mixes comprising stone or stone-like material and a bonding resin.

The vacuum vibro-compression of mixes uses a press with a vibrating ram located in an environment suitable for being placed under vacuum conditions, with very low residual pressure values, in the region of 5-40 mbar.

In the vacuum vibro-compression process supports formed by sheets of paper or non-rigid (elastomer) moulds made of rubberized fabric are normally used. The elastomer mould generally comprises a bottom part provided with a raised edge and a sheet, which is usually not shaped, for covering the mix contained inside the bottom part.

Further information regarding this technology is available in the following patents: IT 1242778, IT 1259130 and IT 1401385.

As is known, the steps involved in the vacuum vibro-compression process comprise:
1) a first step in which the support with the mix is transported inside a vibro-compression zone;
2) a step in which the support and the mix are inserted into a so-called "bell" inside which a vacuum, with a residual pressure in the region of 5-40 mbar, is subsequently created.
3) once the vacuum condition has been reached, a press ram is lowered onto the mix and vibration of the ram is activated;
4) once the vibro-compression step has been completed, the atmospheric pressure values are restored inside the bell; and
5) finally the support with the compacted mix is extracted from the vibro-compression zone after raising the bell beforehand.

As is known to the person skilled in the art, the method for manufacturing this type of slab comprises both steps performed beforehand, such as preparation of the mix, and steps performed afterwards, such as hardening of the slab, and the subsequent machining of the surfaces.

These steps will not be described in further detail, both because they are well-known to the person skilled in the art, and because they do not form a specific subject of the present invention.

This type of vibro-compression apparatus, although widely established and used, is not without drawbacks.

In particular, it has been noted that a needless amount of time and energy is used in order to establish the vacuum condition inside the bell after each vibro-compression cycle and to restore the atmospheric conditions.

The main factors which condition the speed of restoration of the vacuum condition after each vibro-compression cycle are as follows:
 the high internal volume of the press bell;
 the characteristics of the vacuum pumps used and in particular their power; and
 the value of the vacuum which is to be formed inside the bell.

As regards the internal volume of the press bell, it depends essentially on the dimensions of the slab which is to be produced. The slabs may also have considerable dimensions such as a surface area of 3.6 m×2.1 m, which results in an overall volume inside the bell of about 2 m³.

As a result, even using high power vacuum pumps, the time which is normally needed to provide the vacuum inside the bell may vary for example between 20 and 30 seconds.

The mix must then be kept at the pressure value reached, for a sufficient period of time to achieve the desired deaeration. This step may for example have a duration varying between a few seconds and a few tens of seconds.

During these steps, vibro-compression with the press ram has not yet been activated so that, in addition to the times indicated above, a further time necessary for the vibro-compression step, ranging for example between 40 and 60 seconds, must be added.

It must then be considered that the vibro-compressed slab must be extracted from the bell and must be first exposed again to atmospheric pressure, and this step may last for example between 3 and 10 seconds.

Adding together the single times of the intermediate steps, it can be noted that the time of the complete compaction cycle exceeds 110 seconds and may reach and even exceed 160 seconds.

The object of the present invention is therefore to solve at least partially the drawbacks of the prior art.

A first task of the present invention is to provide an apparatus for the vibro-compression of mixes which is such that a substantial reduction in the cycle time, and therefore an increase in the productivity of the plant, may be obtained.

A second task of the present invention is to provide an apparatus for the vibro-compression of mixes which is able to obtain a substantial reduction in the energy consumption associated with the continuous restoration of the vacuum conditions inside the bell.

A further task of the present invention is to provide a method for compacting mixes which is such that a substantial reduction in the cycle times and a substantial reduction in the costs associated with energy consumption may be achieved.

The object and the tasks are achieved with an apparatus, and according to claim 1, a method.

The idea which has occurred, therefore, is to provide an apparatus for vacuum vibro-compression of mixes arranged on a support, comprising a press provided with vibratory devices adapted to cause vibration of a press ram. The press is provided with a vacuum bell having an inlet opening, through which the supports with the mix to be compacted are introduced, and an outlet opening, through which the supports with the compacted mix are conveyed out.

The apparatus comprises at least one vacuum pump in fluid communication with the inside of the bell, for generating a given vacuum value inside the bell.

An entry chamber is provided on the access side of the bell and an exit chamber is provided on the exit side of the bell.

The entry chamber is provided with a first opening for entry of the support with the mix, which can be controllably closed and opened with a first gate adapted to prevent fluid communication between the outside and inside of the entry chamber, and a second gate provided on the access side of the bell and adapted to prevent fluid communication between the entry chamber and inside of the bell.

The exit chamber is provided with a third gate on the exit side of the bell, adapted to prevent fluid communication between the inside of the bell and the exit chamber, and with a second opening for discharging the support with the compacted slab, which can be controllably closed and opened with a fourth gate adapted to prevent fluid communication between the outside and inside of the exit chamber.

The entry chamber and the exit chamber are connected to vacuum generating means.

A device for transferring the supports passing through the chambers has also been devised.

Moreover, a method for the vacuum vibro-compression of mixes arranged on a support, which uses an apparatus as described above, has also been developed, said method comprising the steps of:

a) inserting a support with the mix inside the entry chamber and closing the first gate;
b) generating a given vacuum value inside the entry chamber with the first and second gates closed;
c) opening the second gate and inserting the support inside the bell where a predetermined vacuum value is already present;
d) closing the second opening and performing vacuum vibro-compression of the mix with the second and third gates closed;
e) once the vibro-compression has been completed, opening the third gate and transferring the support with the compacted slab into the exit chamber where a predetermined vacuum value is already present;
f) closing the third gate, restoring the atmospheric pressure inside the exit chamber; and
g) opening the fourth gate and discharging the support with the slab.

Further characteristic features of the present invention are the subject of the dependent claims.

The characteristic features and the advantages of the present invention will emerge more clearly with reference to a number of examples of application, provided by way of non-limiting illustration, with reference the attached drawings in which.

In the attached figures, the reference number 12 denotes an apparatus according to the present invention for vacuum vibro-compression of mixes arranged on a support.

Figure 1:
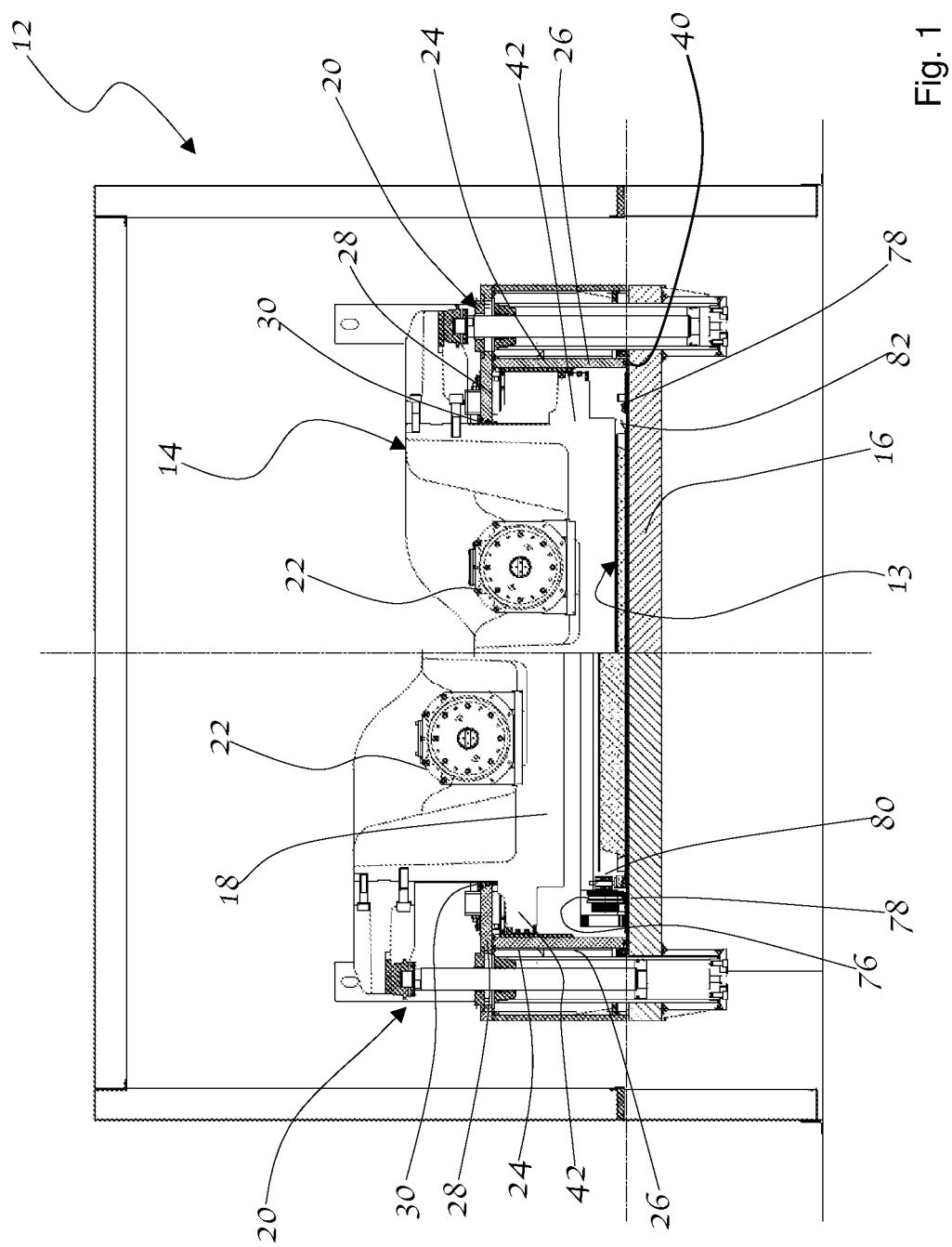
FIG. 1 shows a cross-sectional view, in schematic form, of a press in two different operating conditions, with the ram raised on the left-hand side and with the ram lowered and slab compacted on right-hand side.

As mentioned above, FIG. 1 shows a cross-section through a press 14 for vacuum vibro-compression.

The press 14 comprises a pressing surface 16 and a press ram 18 which may be moved towards or away from the pressing surface 16 by means of movement means 20.

The movement means 20 may comprise, for example, four oil-hydraulic cylinders which are connected to the press ram 18 in the vicinity of its outer edge.

The type and operating principle of the movement means 20 will not be further described because it is known per se to the person skilled in the art and since they do not constitute a specific subject of the present invention.

The press ram 18 is provided with vibratory devices 22 which can be controllably operated so as cause vibration of the ram 18.

The vibratory devices 22, since they are known per se to the person skilled in the art, will also not be further described.

The press 14 comprises a vacuum bell 24, referred to hereinbelow also as bell 24. The bell 24, according to a possible embodiment, may comprises a side wall 26 and an upper peripheral rim 28 partially covering the zone inside which the vacuum is created. The remaining upper covering may be obtained by means of the ram 18 which makes contact with the peripheral rim 28 via a sealing element 30.

Figure 3:
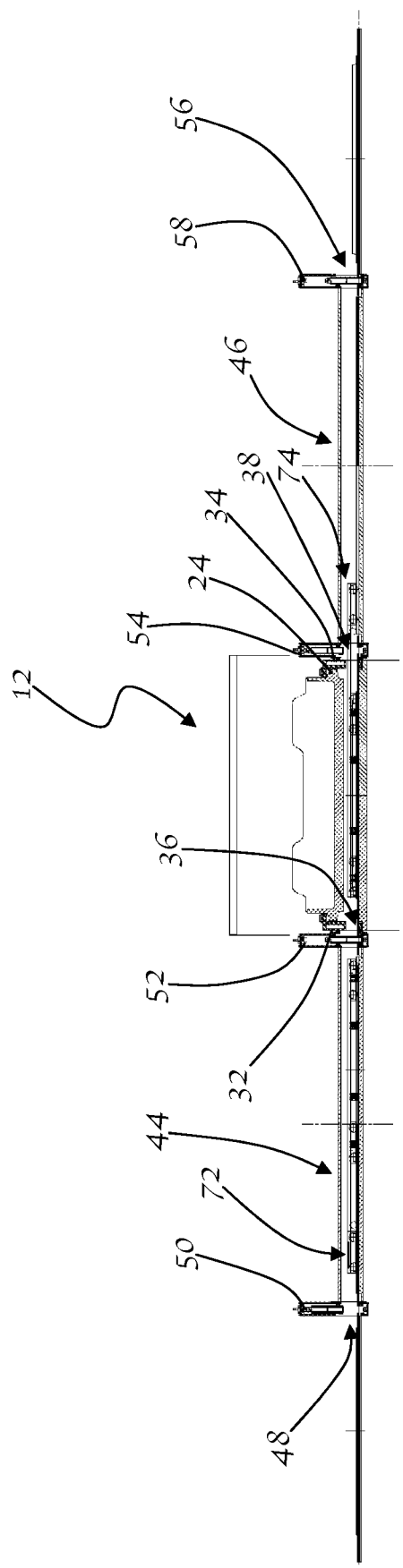
FIGS. 3 and 4 show two longitudinally sectioned views of an apparatus according to the present invention during two different operating steps.
Figure 4:
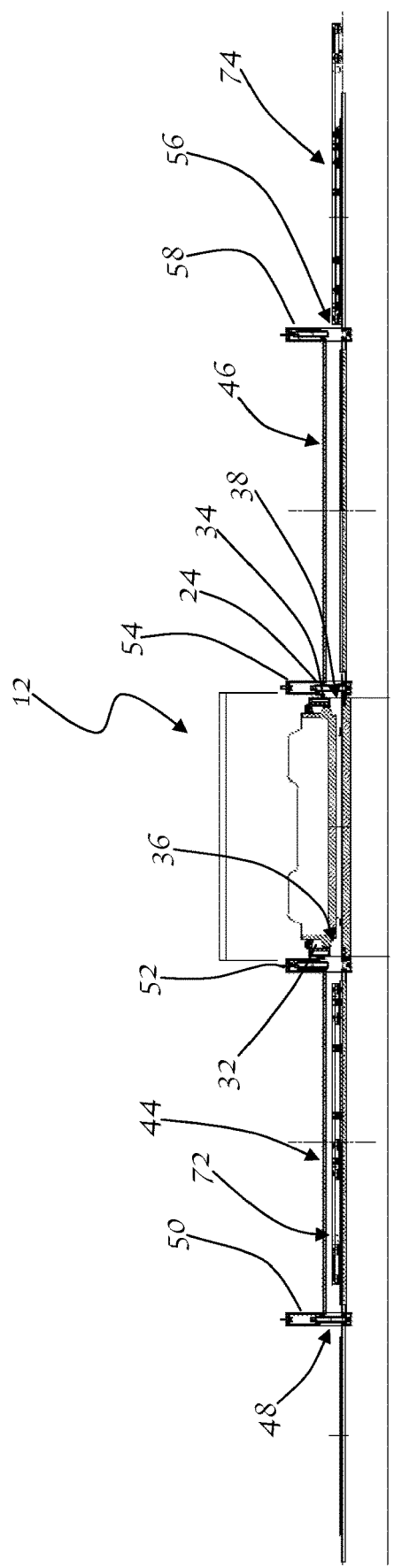

As can be noted from the longitudinal section shown in FIG. 3, an inlet opening 36 and an outlet opening 38 are provided on the transverse parts 32, 34 of the side wall 26.

During operating conditions, the side wall 26 of the bell 24 rests on the pressing surface 16. Advantageously a seal 40 may be arranged between side surface 26 and pressing surface 16 in order to prevent fluid communication between inside and outside of the bell along the perimeter.

When the bell 24 rests on the pressing surface 16, the inside of the bell 24 is however accessible via the inlet opening 36 and the outlet opening 38.

Figure 2:
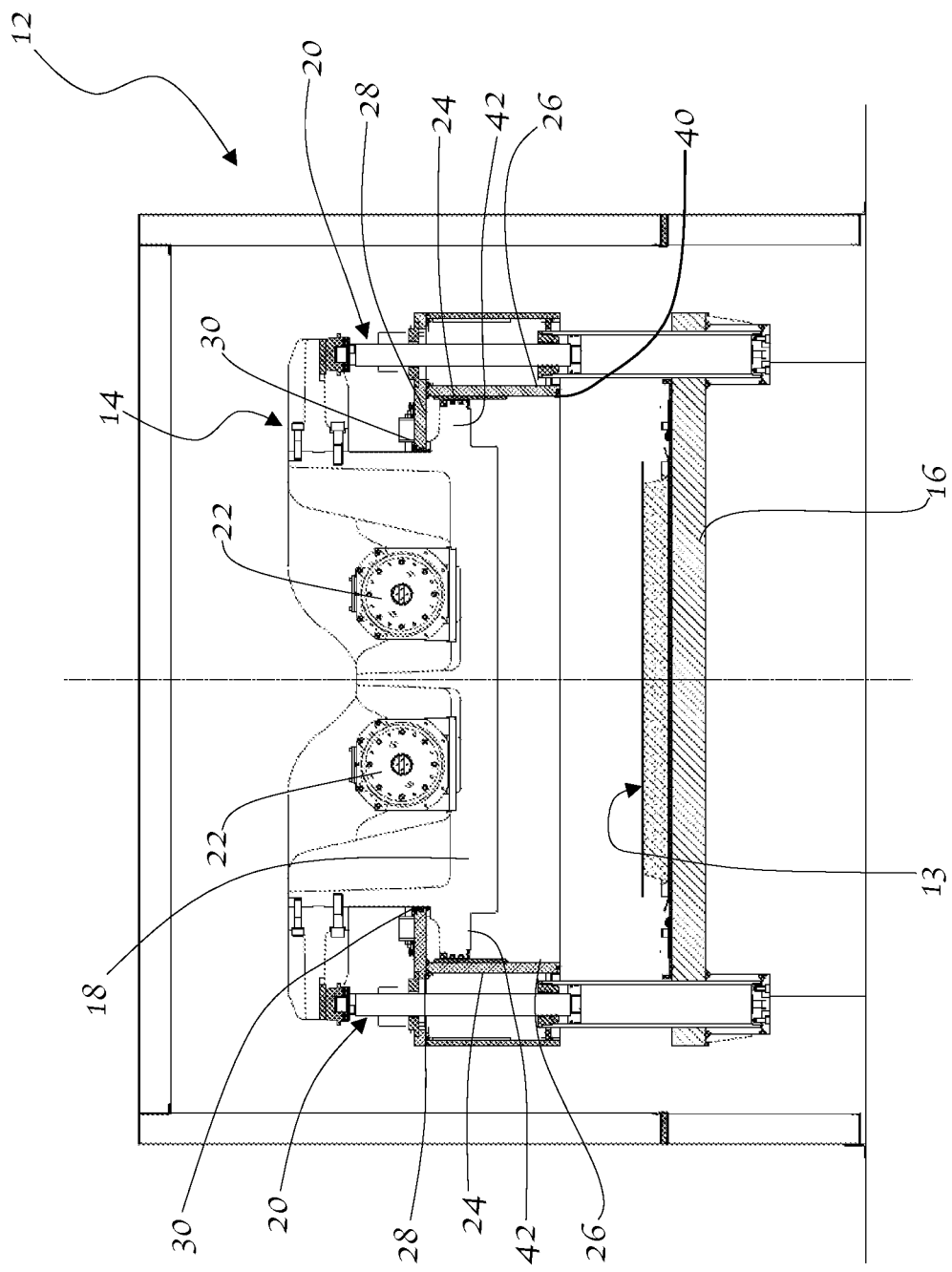
FIG. 2 is similar to FIG. 1, in which, however, in addition to the ram, also the bell is raised.

In accordance with a possible embodiment of the present invention, the bell 24 may be raised with respect to the pressing surface 16 by means of the press ram 18, as can be seen in FIG. 2. For this purpose, the press ram 18 may comprise a projecting peripheral rim 42 adapted to engage, beyond a certain raising height of the press ram 18, with the upper peripheral rim 28 of the bell 24. The height at which engagement occurs is greater than the height to which the press ram 18 is raised in order to insert a support. The bell may then be displaced upwards so as to create an access way for the operator in order to carry out maintenance or cleaning operations.

In accordance with a possible embodiment of the present invention, a further seal may be arranged between press ram 18 and bell 24, in particular between the projecting peripheral rim 42 and the bell 24. Advantageously, a chamber may therefore be created between the bell and the press ram and this chamber may be placed under pressure (for example with a regulatable pneumatic pressure) in order to adjust the pressing force of the ram on the mix during vibration.

An entry chamber 44 is provided in the region of the inlet opening 36 and an exit chamber 46 is provided in the vicinity of the outlet opening.

The entry chamber 44 is provided with a first opening 48 for entry of the support together with the mix, which can be controllably closed and opened with a first gate 50. The first gate 50 is adapted to prevent fluid communication between outside and inside of the entry chamber 44.

The entry chamber 44 is also provided with a second gate 52 which can be controllably closed and opened. The second gate 52 is adapted to prevent fluid communication between entry chamber and inside of the bell 24 or to allow the passage of the support with the mix from the entry chamber to the inside of the bell. The second gate 52 is provided in the vicinity of the inlet opening 36.

The exit chamber 46 is provided with a third gate 54 which can be controllably closed and opened. The third gate 54 is adapted to prevent fluid communication between the inside of the bell 24 and exit chamber 46 or to allow the passage of the support with the compacted slab from inside the bell 24 to the exit chamber 46. The third gate 54 is arranged in the region of the exit opening 38.

The exit chamber 46 is also provided with an opening 56 which can be controllably closed and opened with a fourth gate 58. The fourth gate 58 is adapted to prevent fluid communication between the inside of the exit chamber 46 and the outside and allows exit of the support with the compacted slab.

The entry chamber 44 and the exit chamber 46 may be provided with associated vacuum pumps (not shown). In accordance with a possible alternative embodiment a single vacuum generation plant may be provided so as to serve both the bell 24 and the entry chamber 44 and exit chamber 46, said plant being provided with shut-off valves known per se.

In accordance with a possible embodiment of the present invention, the gates 50, 52, 54, 58 are slidable vertically between an open position and a closed position. Other embodiments of the gates where they may be hinged at the top or in some other way may be envisaged.

Figure 5:
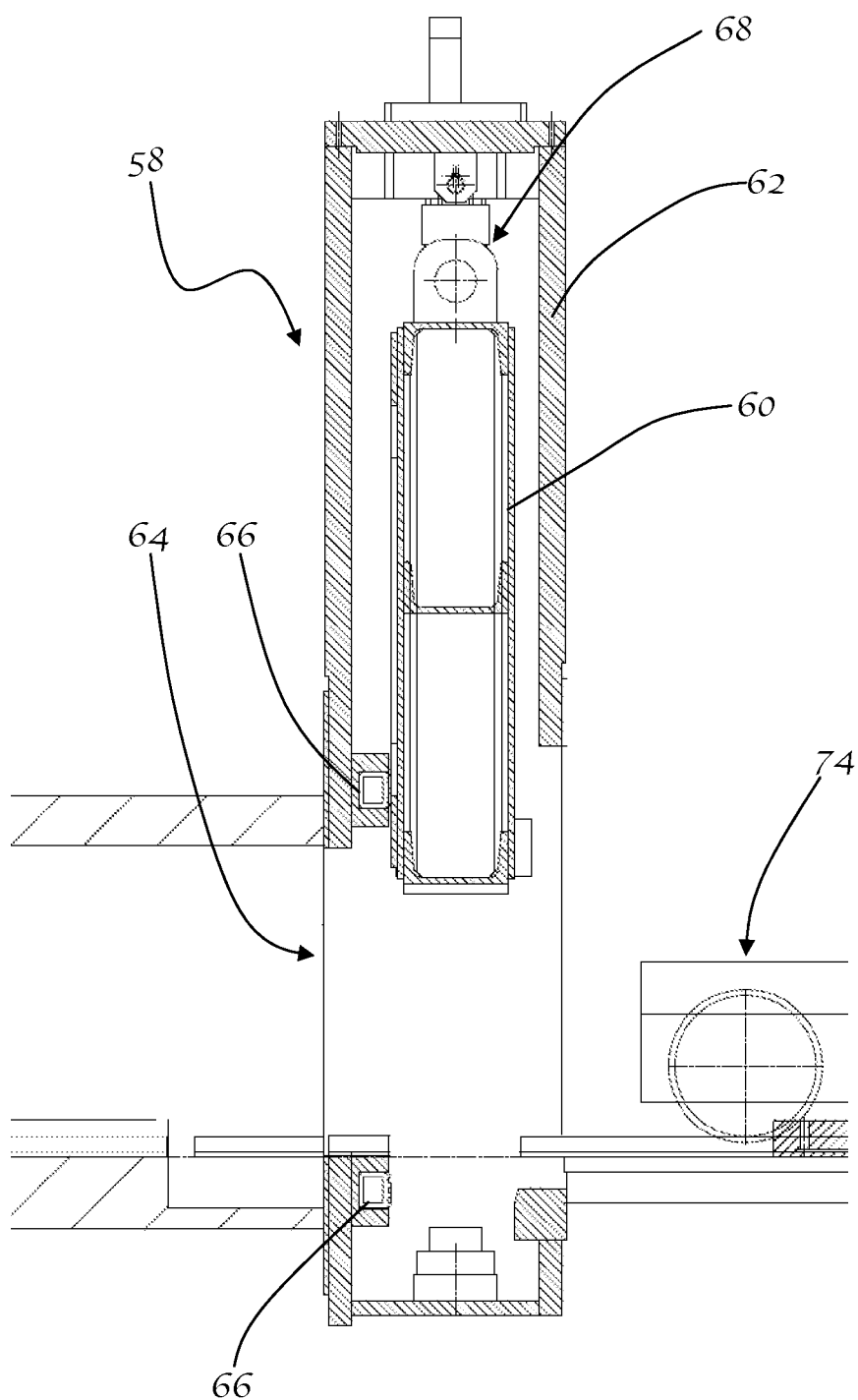
FIGS. 5-8 show in schematic form a number of larger-scale views of some of the components of the apparatus according to the present invention.
Figure 6:
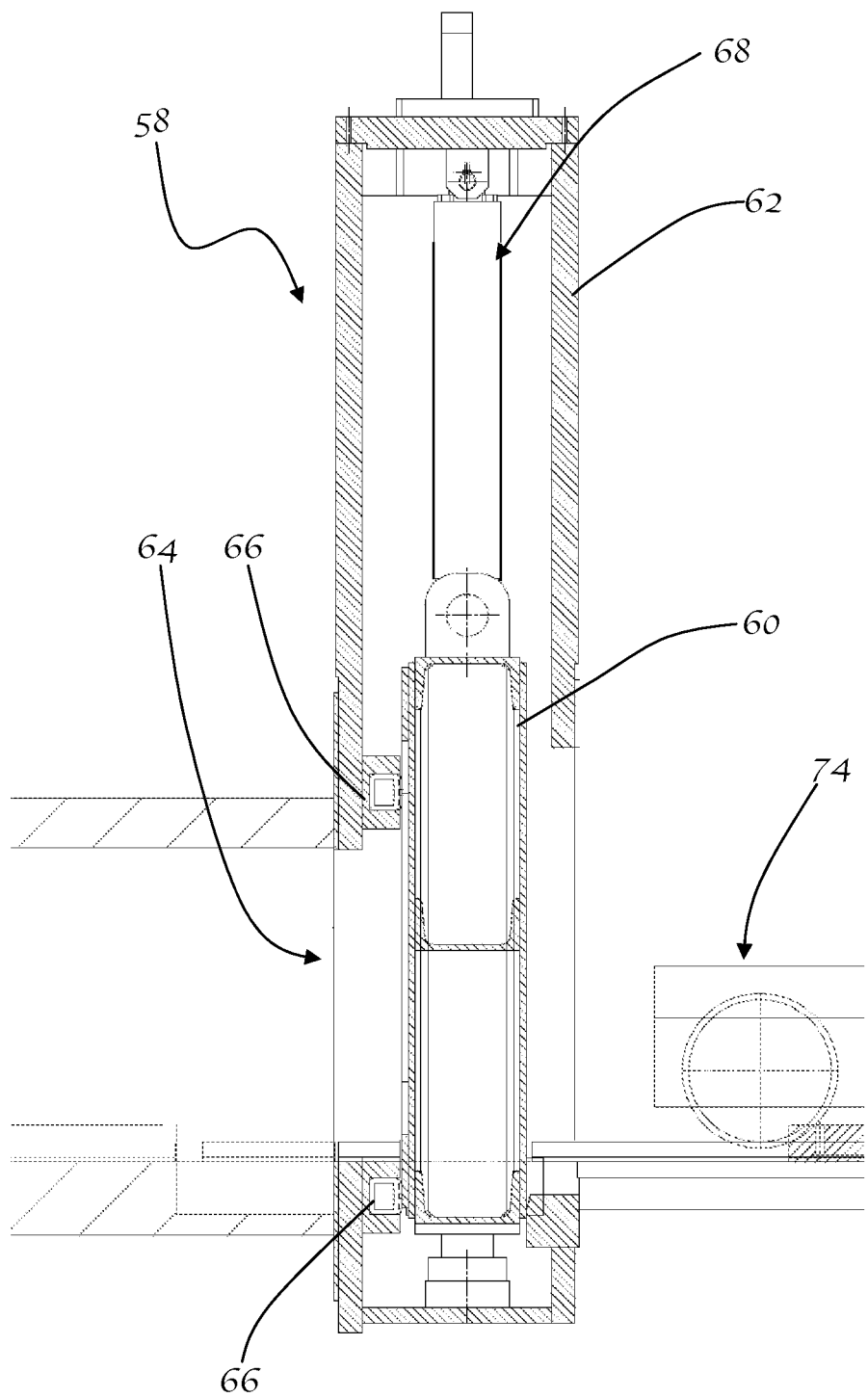

FIGS. 5 and 6 show a possible configuration of a fourth gate 58 in the open position and closed position, respectively. The gate may comprise an element 60 vertically sliding inside a box-shaped element 62 provided with a window 64 for passage of the mould, which can be opened and closed by means of the sliding element 60. The first gate 50 may have a constructional design entirely similar to that of the fourth gate 58.

The edge of the window 64 may be provided with a perimetral seal 66 directed towards the sliding element 60 so as to prevent fluid communication between the sliding element 60 and the box-shaped element 62. Advantageously the seal 66 may be of the inflatable type, as shown in FIGS. 5 and 6, which show the gate in the open condition and closed condition, respectively.

The seal 66 may be a single seal and therefore have a form corresponding to the form of the window, or may consist of separate elements.

The movement of the sliding element 60 of the gate may be obtained by means of an actuator 68 known per se to the person skilled in the art.

Closing of the gate may therefore be performed by means of the lowering of the sliding element towards the bottom of the box-shaped element and by means of subsequent inflation of the seal.

Figure 7:
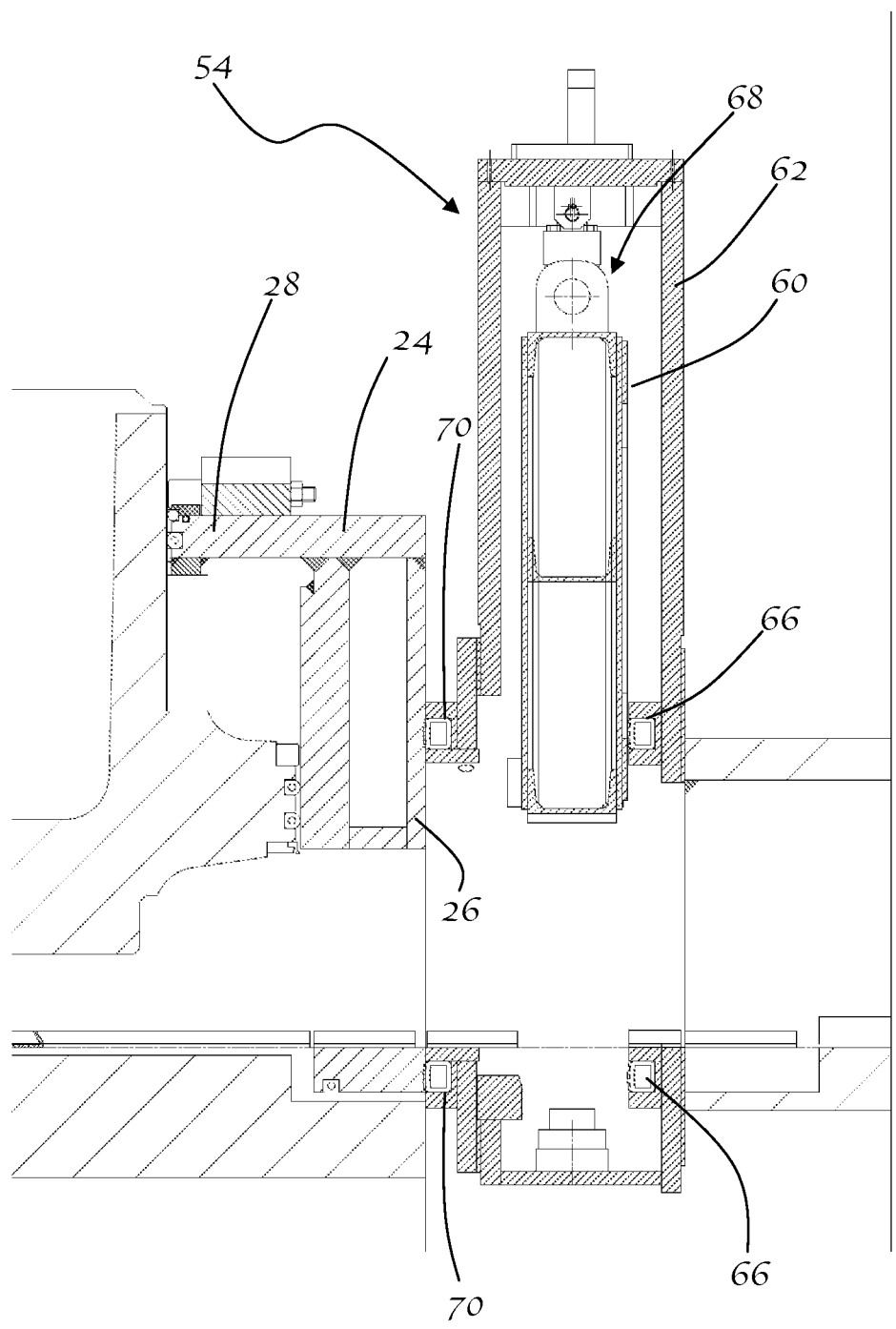
Figure 8:
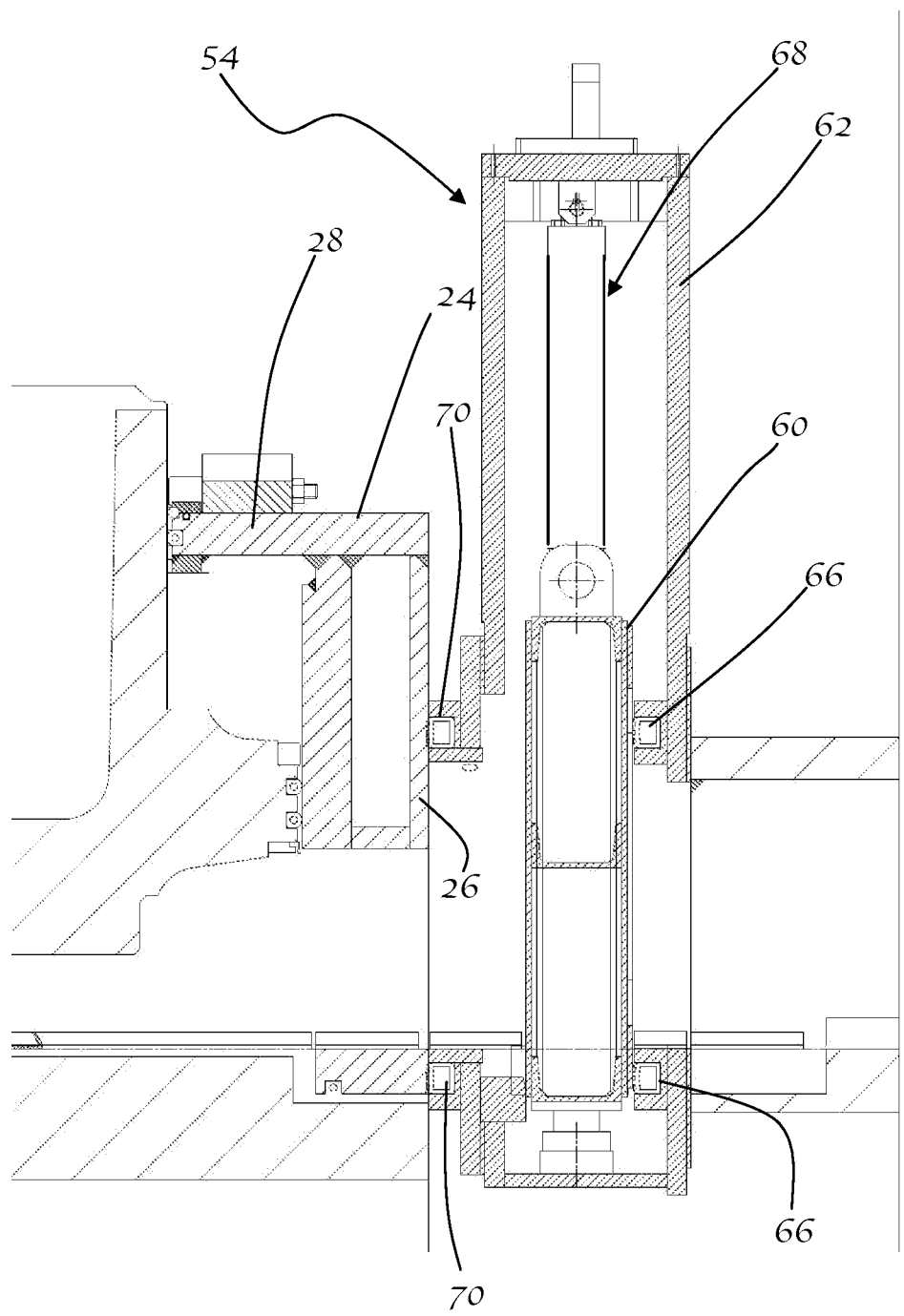

A possible embodiment of the third gate 54 is shown in FIGS. 7 and 8 in which the same parts as for the first and fourth gates are reproduced. A second perimetral seal 70, entirely similar to the seal 66, may also be provided for ensuring the sealing action between an edge of the exit chamber 46 and bell 24. In particular, the seal acts between the side surface of the bell 24 around the outlet opening 46 and the surface of the exit chamber 46 around the corresponding window. The second gate 52 may have a constructional design entirely similar to that of the third gate 54.

Alternative embodiments are also possible where the external structure of the bell forms a single body with the respective entry and exit chambers and therefore there is no need for a seal between these two elements.

Movement means 72, 74 are used for movement of the support inside the apparatus according to the present invention.

In accordance with a possible embodiment of the present invention, the movement mean 73, 74 comprise:
  first movement means 72 for displacement of the support 13 from outside to the entry chamber 44 and then to the inside of the bell 24; and
  second movement means 74 for displacement of the support 13 from inside the bell 24 to the exit chamber 24 and then outside.

The first and second movement means 72, 74 may each comprise a carriage provided with wheels 76 adapted to travel on rails 78.

The carriage may comprise, on each side, lateral grippers 80 adapted to grip a flap 82 provided on each side surface of the support. Advantageously, the flaps 82 project in a direction perpendicular to the direction of advancing movement of the support 13 inside the apparatus. According to this embodiment of the invention, the lateral grippers 80 are therefore adapted to grip the projecting flaps in a direction perpendicular to the direction of advancing movement of the supports.

In order to perform displacement, once the flaps have been gripped, the carriage moves the supports together with their contents, without raising them, causing them to slide over the bottom of the apparatus which acts as a support element, the supports and their contents not having any inherent rigidity.

The operating principle of the apparatus according to the present invention will now be described in detail, with reference to only the vibro-compression step, since the other steps in the process may be conducted in a manner known to the person skilled in the art and in any case they do not constitute a specific subject of the present invention.

The method for the vacuum vibro-compression of mixes contained within a support, using an apparatus 12 according to the present invention, comprises the steps of:
  a) inserting a support with the mix inside the entry chamber 44 and closing the first gate 50;
  b) generating a given vacuum value inside the entry chamber 44 with the first and second gates 50, 52 closed;
  c) opening the second gate 52 and inserting the support together with mix inside the bell 24 where a predetermined vacuum value is already present;
  d) closing the second gate 52 and performing vacuum vibro-compression of the mix with the second and third gates 52, 54 closed;
  e) once the vibro-compression has been completed, opening the third gate 54 and transferring the support with the compacted slab into the exit chamber 46 where a predetermined vacuum value is already present;
  f) closing the third gate 54, restoring the atmospheric pressure inside the exit chamber 46; and
  g) opening the fourth gate 58 and discharging the support with the slab.

Preferably, in order to carry out a continuous cycle for production of the slabs, it is possible, during the step where vibro-compression is performed with the second and third gates 52, 54 closed, to open the first gate 50 for positioning of a support with the mix to be compacted inside the entry chamber 44.

At the same time, it may be envisaged opening the fourth gate 58 in order to unload the support containing the compacted mix inside the exit chamber 46.

As also mentioned above, in the apparatus according to the present invention it is possible to maintain continuously the vacuum condition inside the bell 24.

In this way it is therefore possible to avoid time being wasted in order to cyclically expose the bell to vacuum conditions and atmospheric pressure. It is worth noting that, owing to the small volume of the entry and exit chambers upstream and downstream of the vibro-compression bell, it is also possible to reduce the amount of energy which is used.

It is also worth noting that a further advantage is that the entry chamber 44 is already under vacuum conditions so that the mix is inserted inside the bell 24 already deaerated. The press ram may then be immediately lowered and vibro-compression of the mix performed.

The person skilled in the art, in order to satisfy specific requirements, may make modifications to the embodiments described above and/or replace the parts described with equivalent parts, without thereby departing from the scope of the accompanying claims.

The invention claimed is:

1. A method for production of slabs by means of vacuum vibro-compression of mixes arranged on a support using an apparatus comprising:
  a press provided with a press ram having vibratory devices and a pressing surface on which the support is positionable, the press comprising a vacuum bell provided with an inlet opening and an outlet opening;
  a first means for generating a vacuum inside the vacuum bell;
  an entry chamber in a region of the inlet opening of the vacuum bell and having a first opening that is controllably closable and openable with a first gate so as to prevent fluid communication to and from the entry chamber, the entry chamber comprising a second gate that is controllably closable and openable in the region of the inlet opening of the vacuum bell and is adapted to prevent fluid communication between, and allow passage of the support from and to, the entry chamber and an inside of the vacuum bell, respectively; and
  an exit chamber in a region of the outlet opening of the vacuum bell and having a third gate provided in the region of the outlet opening and controllably closable and openable and adapted to prevent fluid communication between, and allow passage of the support from and to, the inside of the vacuum bell and the exit chamber, respectively, the exit chamber having a second opening that is controllably closable and openable with a fourth gate so as to prevent fluid communication to and from the exit chamber, said entry chamber and said exit chamber being connected to a second vacuum generating means, the method comprising steps of:
  a) inserting the support with a mix thereon inside the entry chamber and closing the first gate;
  b) generating a predetermined vacuum value inside the entry chamber with the first gate and the second gate closed;
  c) opening the second gate and transferring and inserting the support with the mix thereon inside the vacuum bell, whereby a predetermined vacuum value is present in the vacuum bell prior to and during each of said opening of the second gate and said transferring and inserting;
  d) closing the second gate and performing vacuum vibro-compression of the mix with the second gate and the third gate closed, the vacuum vibro-compression being performed to completion so as to compact the mix into a slab;
  e) once the vibro-compression has been completed and the mix is compacted into the slab, opening the third gate and transferring the support with the mix thereon now in a form of a slab into the exit chamber, whereby a predetermined vacuum value is present in the exit chamber prior to and during each of said opening of the third gate and said transferring;
  f) closing the third gate and exposing the slab to atmospheric pressure inside the exit chamber; and
  g) opening the fourth gate and discharging the support from the exit chamber wherein the mix comprises stone or stone-like material and a bonding resin.

2. The method according to claim 1, wherein the support is a first support and the mix is a first mix, and at the same time as said opening of the second gate in order to transfer the first support with the first mix from the entry chamber to the vacuum bell, the third gate is opened in order to transfer a second support with a second compacted mix from the vacuum bell to the exit chamber.

3. The method according to claim 1, characterized in that the support is a first support and the mix is a first mix, and during said vacuum vibro-compression, the first gate is opened for entry of a second mix on a second support into the entry chamber and the fourth gate is opened for exit of a further compacted mix on a third support from the exit chamber.

4. The method according to claim 3, characterized in that during said vibro-compression, deaeration of the second mix takes place in the entry chamber.

5. The method according to claim 1, characterized in that the mix is inserted inside the vacuum bell already deaerated by the vacuum conditions of the entry chamber.

* * * * *